United States Patent Office 3,639,574
Patented Feb. 1, 1972

3,639,574
STABLE HYDROGEN PEROXIDE GELS
Irving R. Schmolka, Grosse Ile, Mich., assignor to BASF Wyandotte Corporation, Wyandotte, Mich.
No Drawing. Continuation-in-part of application Ser. No. 580,204, Sept. 19, 1966. This application Oct. 25, 1967, Ser. No. 677,884
Int. Cl. A61k 27/00, 7/12
U.S. Cl. 424—78                    7 Claims

ABSTRACT OF THE DISCLOSURE

Aqueous hydrogen peroxide gels possessing enhanced stability, useful in treating surface cuts and bleaching hair, are prepared employing certain polyoxyethylene polyoxypropylene block copolymers as gelling agents.

---

This application is a continuation-in-part of copending U.S. patent application Ser. No. 580,204, filed Sept. 19, 1966.

The present invention relates to stable hydrogen peroxide gels. More particularly, the present invention relates to aqueous hydrogen peroxide gels of polyoxyethylene polyoxypropylene block copolymers.

Hydrogen peroxide gels have long been desired in the art. These gels could be useful in the treatment of hair, particularly in bleaching of hair and more particularly in "frosting," "streaking," or "tipping" of hair, and for the treatment of surface cuts and wounds. Notwithstanding the desirability of hydrogen peroxide gels, no such commercially available gels have found acceptance in the art, primarily because of the fact that very few organic gelling agents have been found which are compatible with hydrogen peroxide and which are not decomposed thereby.

It is an object of the present invention to provide stable aqueous hydrogen peroxide gels. Another object of the present invention is to provide stable hydrogen peroxide gels which may be prepared from ingredients which do not require heating to bring about the formation of the gel. These and other objects of the invention will be apparent from the following disclosures.

The above objects of the present invention are accomplished by the use of certain polyoxyethylene polyoxypropylene block copolymer gelling agents. It was unexpected and surprising to find that stable hydrogen peroxide gels could be prepared from these gelling agents since these polyoxyethylene polyoxypropylene block copolymers generally decompose in the presence of oxidizing agents.

As used herein, the term "gel" is defined as a solid or semisolid colloid containing considerable quantities of water. The particles in a gel are linked in a coherent meshwork which immobilizes the water. A colloidal solution with water as the dispersion medium is called, more specifically, a "hydrosol." The gels within the scope of the present invention are more specifically "ringing" gels and may be described as gels that have a firm jelly-like consistency; that is, by tapping the gel lightly it will vibrate and return to its original configuration.

The gels of the present invention comprise, based on a total of 100 parts by weight, (a) from about 1 part to 20 parts, preferably from 1 part to 10 parts, of hydrogen peroxide, (b) from about 20 parts to about 77 parts, preferably from 50 parts to 77 parts, of water, and (c) from about 22 parts to 79 parts, preferably from 22 parts to 40 parts, of a polyoxyethylene polyoxypropylene block copolymer. The polyoxyethylene polyoxypropylene block copolymers which may be employed in the preparation of the gels of the present invention may be represented by the formula (I)      $HO(C_2H_4O)_b(C_3H_6O)_a(C_2H_4O)_bH$ wherein $a$ is an integer such that the hydrophobe base represented by $(C_3H_6O)$ has a molecular weight of at least 2250, preferably from 2750 to 4000, and $b$ is an integer such that the hydrophile portion represented by $(C_2H_4O)$ constitutes from about 10 to 90, preferably from 50 to 90, weight percent of the copolymer.

The hydrophobe base of the polyoxyethylene polyoxypropylene block copolymers of Formula I above is prepared by adding propylene oxide to the two hydroxyl groups of a propylene glycol nucleus. By adding ethylene oxide to the hydrophobe base, it is possible to put polyoxyethylene hydrophilic groups on both ends of the molecule. These hydrophilic polyoxyethylene groups may be controlled to constitute anywhere from 10% to 90% of the final molecule. A more detailed explanation of the preparation of these block copolymers may be found in U.S. Pat. No. 2,674,619.

Illustrative block copolymers of Formula I above which may be employed in the preparation of the gels of the present invention are presented in Table I.

TABLE I

| Copolymer | Mol. wt. of hydrophobe base (average) | Wt. percent of hydrophile (average) | Approx. total mol. wt. of copolymer |
|---|---|---|---|
| A | 2,250 | 50 | 4,600 |
| B | 2,250 | 70 | 7,500 |
| C | 2,250 | 80 | 10,750 |
| D | 2,750 | 45 | 4,910 |
| E | 2,750 | 60 | 6,450 |
| F | 2,750 | 80 | 13,500 |
| G | 3,250 | 35 | 4,910 |
| H | 3,250 | 45 | 6,050 |
| J | 3,250 | 50 | 6,550 |
| K | 3,250 | 80 | 15,500 |
| L | 4,000 | 15 | 4,710 |
| M | 4,000 | 25 | 5,340 |
| N | 4,000 | 35 | 6,150 |
| P | 4,000 | 70 | 13,500 |
| Q | 4,000 | 80 | 20,000 |

Not all of the block copolymers of the formula (I)      $HO(C_2H_4O)_b(C_3H_6O)_a(C_2H_4O)_bH$ may be employed in the present invention. Because of the nature of aqueous solutions of these block copolymers, three variables effect the formation of the gels. Therefore, it is necessary to recognize certain minimums for the three variables. These variables are:

(1) the weight percent concentration of block copolymers in the gel,
(2) the molecular weight of the hydrophobe base $(C_3H_6O)_a$, and
(3) the weight percent of the hydrophile portion $(C_2H_4O)_b$ of the copolymer.

These minimums define a minimum weight percent concentration of the block copolymer with a specific molecular weight polyoxypropylene hydrophobe base having a minimum weight percent of ethylene oxide condensed thereto necessary to form the gels. Thus, at the minimum concentration with a specific molecular weight hydrophobe base, a minimum weight percent of ethylene oxide is required before a specific block copolymers will form a gel in an aqueous solution. The minimum weight percent concentrations with specific molecular weight hydrophobe bases are set out in Table II.

TABLE II

| Mol. wt. of hydrophobe base | Min. weight percent concentration to form a gel | Min. weight percent of ethylene oxide required | Total mol. wt. of block copolymer |
|---|---|---|---|
| 2,250 | 40 | 50 | 4,600 |
| 2,750 | 40 | 45 | 4,910 |
| 2,750 | 30 | 60 | 6,450 |
| 3,250 | 30 | 35 | 4,910 |
| 4,000 | 50 | 15 | 4,710 |
| 4,000 | 30 | 35 | 6,150 |
| 4,000 | 20 | 70 | 13,500 |

In interpreting Table II, it is apparent that at least a 40% weight concentration of the block copolymer having a hydrophobe base of at least 2,250 molecular weight with at least about 50 weight percent of ethylene oxide condensed thereto will be necessary to form a gel in an aqueous solution. In all cases, the block copolymers above the minimums indicated in Table I will form gels in aqueous solutions up to 90 weight percent concentration and higher. Above 90 weight percent concentration, however, the gels tend to become indistinguishable from the starting block copolymer itself. It is to be understood that the molecular weight of the hydrophobe base may be other than those illustrated in Table I. Thus, for example, if a hydrophobe base of about 2,500 molecular weight is used, it is recognized that a gel may be formed from the block copolymer at a concentration of 40 weight percent in an aqueous solution where about 45 weight percent of ethylene oxide is present in the block copolymer.

The technical explanation for the formation of the gels of the invention is not entirely understood, and the explanation hereinafter is not to be considered as being limitative of the invention. However, the behavior of these block copolymers in forming the gels is believed to be explained on the basis of hydrate formation. It may be speculated that the hydrophobe, because it is different from the hydrophobe of other types of non-ionics, may, in its own right, immobilize the water independently of the oxyethylene chain by hydrogen bonding. It is noteworthy that gel formation occurs at about 70° to 80° F., even where the block copolymer contains more than 200 moles of ethylene oxide or over 100 moles per block. It is also believed that the nature of the block copolymer adds to this phenomena. It should be noted that the block copolymer used in the gels of this invention exhibits a hydrophobe lying between two equal hydrophiles, whereas nonionics commonly encountered, such as the oxyethylated fatty alcohols and alkyl phenols, have only one hydrophile chain. This difference in structure suggests that a loose micellar structure is obtained with this class of nonionics and that gel formation would more readily involve entrapment of free water in addition to water due to hydrogen bonding.

The gels of the invention may be prepared in either of two ways. The block copolymers may be dissolved in water cooled to a temperature between 35° F. and 50° F., and hydrogen peroxide, usually in the form of a concentrated solution (30% to 80% by weight), slowly added to the cool copolymer solution. The solution is then allowed to warm to room temperature whereby a clear ringing gel is formed. Alternatively, the concentrated hydrogen peroxide solution may be added to the cold water and then the block copolymer may be added with good mixing. Mixing is continued, maintaining the solution temperature below 50° F. until the copolymer is completely in solution. At this point, the solution is allowed to warm to room temperature whereby a clear ringing gel is formed.

The following examples illustrate the nature of the invention. All parts are by weight unless otherwise stated.

EXAMPLE I

A hydrogen peroxide gel useful in the treatment of surface cuts was prepared from the following ingredients:

|  | Parts |
|---|---|
| Copolymer P | 25 |
| Hydrogen peroxide (30% aqueous solution) | 10 |
| Water | 65 |

Copolymer P is a 13,500 molecular weight block copolymer of Formula I having a hydrophobe average molecular weight of 4000 and a hydrophile constituting 70% by weight of ethylene oxide based on the total weight of the copolymer.

The gel was prepared by adding Copolymer P to water at 35° F. and mixing until all of the copolymer had dissolved in the water. The hydrogen peroxide solution was then slowly added to the cooled solution. The solution was then allowed to warm to room temperature whereby a ringing gel formed.

The gel containing an initial peroxide content of 2.55% (3.0% theoretical), as determined by a coulometric thiosulfate titration. The stability of the gel was tested by periodically determining the peroxide content of the gel. Results of this test are presented in Table III.

Table III

| Time, weeks: | Percent, peroxide |
|---|---|
| 0 | 2.55 |
| 4 | 2.51 |
| 8 | 2.47 |
| 12 | 2.42 |

EXAMPLE II

A hydrogen peroxide gel useful in the bleaching of human hair was prepared by adding 20 parts of a 30% hydrogen peroxide aqueous solution to 55 parts of water at 35° F. to 50° F. To this solution, 25 parts of Copolymer P was added with good stirring maintaining the solution temperature below 50° F. Stirring continued until Copolymer P was completely in solution, at which point the solution was allowed to warm to room temperature whereby a gel formed. The gel contained an initial peroxide content of 5.83% (6.0% theoretical), as determined by a coulometric thiosulfate titration. After four weeks, the peroxide content was found to be 5.70%.

EXAMPLE III

Following the procedure of Example I, a gel useful in the bleaching of human hair was prepared from the following ingredients and amounts thereof:

|  | Parts |
|---|---|
| Copolymer P | 30 |
| Hydrogen peroxide (70% aqueous solution) | 20 |
| Water | 50 |

A gel was obtained which in itself was surprising, particularly since the gel contained about 14% hydrogen peroxide.

EXAMPLE IV

Following the procedure of Example I, a gel useful in the bleaching of human hair and in the treatment of surface cuts was prepared from the following ingredients and amounts thereof:

|  | Parts |
|---|---|
| Copolymer F | 37.0 |
| Hydrogen peroxide (70% aqueous solution) | 4.5 |
| Water | 58.5 |

Copolymer F is a 13,500 average molecular weight block copolymer of Formula I having a hydrophobe average molecular weight of 2750, and a hydrophile constituting about 80% by weight of the copolymer. The gel exhibits an exceptionally stable hydrogen peroxide content even after 12 weeks.

EXAMPLE V

Following the procedure of Example I, a gel was prepared from the following ingredients and amounts thereof:

| | Parts |
|---|---|
| Copolymer K | 35.0 |
| Hydrogen peroxide (70% aqueous solution) | 4.3 |
| Water | 60.7 |

Copolymer K is a 15,500 average molecular weight block copolymer of Formula I, having a hydrophobe average molecular weight of 3250 and a hydrophile constituting about 80% by weight of the copolymer. A highly stable gel resulted which exhibits results substantially similar to those obtained in Example I.

What is claimed is:

1. A stable gel comprising, based on a total of 100 parts by weight,
    (a) from about 1 part to about 20 parts of hydrogen peroxide,
    (b) from about 20 parts to about 77 parts of water, and
    (c) from about 22 parts to about 79 parts of a copolymer of the formula $$HO(C_2H_4O)_b(C_3H_6O)_a(C_2H_4O)_bH$$

wherein $a$ is an integer such that the hydrophobe base represented by $(C_3H_6O)$ has a molecular weight of at least 2250, and $b$ is an integer such that the hydrophile portion represented by $(C_2H_4O)$ constitutes from about 10 to 90 weight percent of the copolymer.

2. The gel of claim 1 when the copolymer has an average molecular weight hydrophobe base of from 2750 to 4000.

3. The gel of claim 1 when the hydrophile portion of the copolymer constitutes from 50 to 90 weight percent of the copolymer.

4. The gel of claim 1 when the copolymer has an average molecular weight hydrophobe base of from 2750 to 4000 and a hydrophile portion of the copolymer constitutes from 50 to 90 weight percent of the copolymer.

5. The gel of claim 1 when
    (a) is from 1 part to 10 parts of hydrogen peroxide,
    (b) is from 50 parts to 77 parts of water, and
    (c) is from 22 parts to 40 parts of a copolymer of the formula $$HO(C_2H_4O)_b(C_3H_6O)_a(C_2H_4O)_bH$$

wherein $a$ is an integer such that the hydrophobe base represented by $(C_3H_6O)$ has a molecular weight of at least 2250, and $b$ is an integer such that the hydrophile portion represented by $(C_2H_4O)$ constitutes from about 10 to 90 weight percent of the copolymer.

6. A process for the preparation of a gel of claim 1 which comprises the steps of
    (a) dissolving a copolymer of the formula $$HO(C_2H_4O)_b(C_3H_6O)_a(C_2H_4O)_bH$$

wherein $a$ is an integer such that the hydrophobe base represented by $(C_3H_6O)$ has a molecular weight of at least 2250, and $b$ is an integer such that the hydrophile portion represented by $(C_2H_4O)$ constitutes from about 10 to 90 weight percent of the copolymer, in water at a temperature between 35° F. and 50° F.,
    (b) adding an aqueous solution of hydrogen peroxide to the cool copolymer solution of step (a), and
    (c) allowing the solution resulting from step (b) to warm to room temperature whereby a clear gel is formed.

7. A process for the preparation of a gel of claim 1 which comprises the steps of
    (a) adding an aqueous solution of hydrogen peroxide to water at a temperature between 35° F. and 50° F.,
    (b) dissolving a copolymer of the formula $$HO(C_2H_4O)_b(C_3H_6O)_a(C_2H_4O)_bH$$

wherein $a$ is an integer such that the hydrophobe base represented by $(C_3H_6O)$ has a molecular weight of at least 2250, and $b$ is an integer such that the hydrophile portion represented by $(C_2H_4O)$ constitutes from about 10 to 90 weight percent of the copolymer, in the solution resulting from step (a) while maintaining the temperature of said solution between 35° F. and 50° F., and
    (c) allowing the solution resulting from step (b) to warm to room temperature whereby a clear gel is formed.

References Cited

UNITED STATES PATENTS

| | | | |
|---|---|---|---|
| 2,674,619 | 4/1954 | Lundsted | 260—485 |
| 2,991,228 | 7/1961 | Lustig | 167—72 |
| 3,036,118 | 5/1962 | Jackson | 260—615 X |
| 3,140,232 | 7/1964 | Noseworthy | 167—63 X |

FOREIGN PATENTS

| | | | |
|---|---|---|---|
| 225,568 | 5/1958 | Australia | 167—88.1 |
| 784,659 | 10/1957 | Great Britain | 167—63 |
| 821,726 | 10/1959 | Great Britain | 167—88.1 |

ALBERT T. MEYERS, Primary Examiner

D. R. ORE, Assistant Examiner

U.S. Cl. X.R.

252—313; 424—62, 130, 341, 342